(12) United States Patent
Takase et al.

(10) Patent No.: US 7,402,539 B2
(45) Date of Patent: Jul. 22, 2008

(54) BATTERY SEPARATOR

(75) Inventors: Toshiaki Takase, Ibaraki (JP); Yoshihiko Kondo, Ibaraki (JP); Noriko Miyaguchi, Ibaraki (JP); Masanao Tanaka, Ibaraki (JP)

(73) Assignee: Japan Vilene Co., Ltd., Tokyo (JP)

( * ) Notice: Subject to any disclaimer, the term of this patent is extended or adjusted under 35 U.S.C. 154(b) by 503 days.

(21) Appl. No.: 09/924,546

(22) Filed: Aug. 9, 2001

(65) Prior Publication Data
US 2002/0090876 A1 Jul. 11, 2002

(30) Foreign Application Priority Data
Aug. 10, 2000 (JP) .............................. 2000-243230

(51) Int. Cl.
*D04H 1/00* (2006.01)
*D04H 1/04* (2006.01)
*D04H 1/40* (2006.01)
*D04H 1/54* (2006.01)
*H01M 2/16* (2006.01)

(52) U.S. Cl. ....................... 442/341; 442/340; 442/351; 442/350; 442/363; 442/414; 429/249

(58) Field of Classification Search ................. 442/327, 442/340, 346, 351, 363, 361, 333, 334, 341, 442/344, 347, 350, 409, 411, 414; 428/220; 429/249, 247
See application file for complete search history.

(56) References Cited

U.S. PATENT DOCUMENTS

| 5,888,916 | A | * | 3/1999 | Tadokoro et al. ............ 442/334 |
| 6,037,079 | A | * | 3/2000 | Tanaka et al. ................ 429/142 |
| 6,284,680 | B1 | * | 9/2001 | Aikawa et al. ............... 442/363 |
| 6,355,375 | B2 | * | 3/2002 | Tanaka et al. ................ 429/142 |
| 6,403,265 | B1 | * | 6/2002 | Tanaka et al. ................ 429/249 |
| 6,468,651 | B2 | * | 10/2002 | Aikawa et al. ............... 428/364 |
| 6,586,137 | B1 | * | 7/2003 | Tanaka et al. ................ 429/249 |
| 6,605,348 | B1 | * | 8/2003 | Ohta et al. ................... 428/364 |
| 6,607,859 | B1 | * | 8/2003 | Tanaka et al. ................ 429/145 |
| 2001/0029138 | A1 | * | 10/2001 | Aikawa et al. ................. 442/59 |
| 2002/0155347 | A1 | * | 10/2002 | Tanaka et al. ................ 429/144 |
| 2002/0160260 | A1 | * | 10/2002 | Tanaka et al. ................ 429/144 |

FOREIGN PATENT DOCUMENTS

| EP | 0 834 936 A1 | 4/1998 |
| EP | 834938 A2 * | 4/1998 |
| EP | 0 848 436 A2 | 6/1998 |
| EP | 0 861 929 A1 | 9/1998 |
| JP | 56 138863 A | 10/1981 |
| JP | 08-035192 | 2/1996 |
| JP | 10 312786 A | 11/1998 |
| JP | 11-126595 * | 5/1999 |
| JP | 11-144698 | 5/1999 |
| JP | 11-329393 | 11/1999 |
| JP | 2000-113870 | 4/2000 |
| JP | 2000-160432 | 6/2000 |
| JP | 2000-315488 | 11/2000 |
| JP | 2000 353509 A | 12/2000 |

* cited by examiner

*Primary Examiner*—Cheryl Juska
(74) *Attorney, Agent, or Firm*—Sughrue Mion, PLLC

(57) ABSTRACT

Disclosed is a battery separator consisting essentially of a nonwoven fabric having a substantially unilayered structure, wherein an apparent total surface area of fibers per a surface density of the nonwoven fabric is 20 m$^2$ or more, a thickness of the nonwoven fabric is 0.1 mm or less, a uniformity index of the nonwoven fabric is 0.15 or less, and the nonwoven fabric contains fine fibers having a fiber diameter of 4 μm or less.

22 Claims, No Drawings

BATTERY SEPARATOR

BACKGROUND OR THE INVENTION

1. Field of the Invention

The present invention relates to a battery separator.

2. Description of the Related Art

In a battery, a separator is used to separate a positive electrode and a negative electrode from each other to prevent a short circuit therebetween, and further, to hold an electrolyte thereon and enable a smoothelectromotive reaction.

Recently, in electronic equipment, a space allotted for the battery has become smaller due to the need for miniaturization and weight-saving. Nevertheless, the performance requirement for such a smaller battery is the same as or higher than that for a conventional battery, and therefore, it is necessary to enhance the capacity of the battery, and to increase the amounts of active materials in the electrodes. Accordingly, a volume allotted in the battery for the separator must be reduced. Although a thin separator having a thickness of 0.15 mm was proposed, a thinner separator having a thickness of 0.1 mm or less is desired in the market.

A separator that can be thinned to a thickness of 0.1 mm or less is proposed in, for example, Japanese Unexamined Patent Publication (Kokai) No. 11-126595. This Publication discloses an alkaline battery separator having a mass per unit area of 15 to 55 g/m$^2$, a void rate of 40 to 80%, and a thickness of 0.05 to 0.12 mm, and composed of a laminated nonwoven fabric prepared by adhering fine-fiber nonwoven fabrics onto both sides of a nonwoven fabric produced by a wet-laid method and containing sheath-core type composite fibers consisting of a sheath polymer with a low melting point and a core polymer with a high melting point.

However, the separator disclosed in the above Japanese Unexamined Patent Publication (Kokai) No. 11-126595 is composed of the laminated nonwoven fabric prepared by adhering fine-fiber nonwoven fabrics and the nonwoven fabric produced by a wet-laid method, and thus, the electrolyte is unevenly distributed at the fine-fiber nonwoven fabrics. Therefore, an inner pressure is increased, and as a result, it becomes difficult to enhance the capacity of the battery, although the separator is designed to be thinner to enable an enhancement of the capacity of the battery.

SUMMARY OF THE INVENTION

Accordingly, the object of the present invention is to remedy the above disadvantages of the prior art and provide a thin battery separator enabling an enhancement of the capacity of the battery.

Other objects and advantages of the present invention will be apparent from the following description.

In accordance with the present invention, there is provided a battery separator consisting essentially of a nonwoven fabric having a substantially unilayered structure, wherein an apparent total surface area of the fibers per a surface density of the nonwoven fabric is 20 m$^2$ or more, a thickness of the nonwoven fabric is 0.1 mm or less, a uniformity index of the nonwoven fabric is 0.15 or less, and the nonwoven fabric contains fine fibers having a fiber diameter of 4 μm or less.

As the nonwoven fabric used for the battery separator of the present invention has a substantially unilayered structure, an electrolyte can be evenly held throughout the nonwoven fabric, and therefore, a battery having a low inner pressure and a high capacity can be assembled. Further, the nonwoven fabric has the apparent total surface area of the fibers per a surface density of 20 m$^2$ or more, even though the thickness is as thin as 0.1 or less. Therefore, a battery separator having a good electrolyte-holding capacity, particularly, a long-term electrolyte-holding capacity, can be prepared and thus a battery having a long-term lifetime, can be assembled.

DESCRIPTION OF THE PREFERRED EMBODIMENTS

The nonwoven fabric used for the battery separator of the present invention has a substantially unilayered structure, to avoid an uneven distribution of electrolyte. The expression "substantially unilayered structure" as used herein for the nonwoven fabric means that an average fiber diameter of a portion having a fiber composition and fiber combination different from that of the whole nonwoven fabric in a direction of the thickness of the nonwoven fabric ranges within ± 20% of an average fiber diameter of a whole nonwoven fabric. Therefore, the nonwoven fabric used for the battery separator of the present invention may be prepared by laminating a plurality of fiber webs, so long as this satisfies the requirement that the laminate is uniform with respect to the average fiber diameter.

The term "direction of the thickness" or "thickness direction" as used herein means a direction at a right angle to a planar surface of the nonwoven fabric. In this connection, a planar surface of a nonwoven fabric is not smooth, and thus, the planar surface of the nonwoven fabric means a surface of a plate mounted on the surface of the nonwoven fabric. Further, the thickness direction means a direction at a right angle to the surface of the plate. The term "average fiber diameter" as used herein with respect to short fibers means an average of fiber diameters of 100 or more short fibers. The term "average fiber diameter" as used herein with respect to long fibers means an average of fiber diameters of 100 or more points of long fibers. The term "fiber diameter" as used herein with respect to a fiber having a circular cross-sectional shape means a diameter of the circle. For a fiber having a non-circular cross-sectional shape, a diameter of a circle having an area the same as that of the non-circular cross-sectional shape is regarded as a diameter.

It is preferable that the nonwoven fabric used for the battery separator of the present invention consists essentially of non-fibrillated fibers, where the nonwoven fabric is composed of one or more kinds of fibers. When the nonwoven fabric consists essentially of non-fibrillated fibers, the uniformity of the nonwoven fabric becomes uniform, and an electrolyte can be evenly held throughout the whole nonwoven fabric.

The expression "non-fibrillated fiber" as used herein means a fiber without a binding portion of plural fibers. A fiber that is not the "non-fibrillated fiber" is, for example, a fiber having many branches divided therefrom (for example, fibers prepared by beating mechanically dividable fibers by a beater, or pulp), or fibers having a network structure formed by binding plural fibers to each other before a fusion treatment (for example, fibers obtained by a flush spinning method).

The nonwoven fabric used for the battery separator of the present invention may be formed from one or more materials, such as polyamide-based fibers, polyolefin-based fibers, or the like. It is preferable that the nonwoven fabric consists essentially of polyolefin-based fibers, because such fibers exhibit an excellent resistance to an electrolyte, and do not generate the ammonia that is believed to be a cause of self-discharging. The polyolefin-based fibers means a fiber that is composed of only polyolefin-based resin as a whole, and a fiber that is composed of polyolefin-based resin in at least a surface thereof. This is because a part having an influence on the resistance to an electrolyte is the surface of the fiber.

Therefore, for example, a composite fiber composed of a polyamide resin and a polyolefin resin, and having a surface consisting of polyolefin-based resin (except for both ends) is included in the above polyolefin-based fiber. As the polyolefin-based resin, there may be mentioned, for example, polyethylene-based resins, such as, ultra-high-molecular-weight polyethylene, high-density polyethylene, middle-density polyethylene, low-density polyethylene, linear low-density polyethylene, or ethylene copolymers, polypropylene-base resin, such as polypropylene, propylene copolymers, or polymethylpentene-based resin, such as polymethylpentene, methylpentene copolymers. Of these resins, polypropylene-based resin or polyethylene-based resin is preferable.

Preferably, the nonwoven fabric used for the battery separator of the present invention contains high-modulus fibers having a Young's modulus of 50 cN/dtex or more. Because of the elasticity of the high-modulus fibers, a short circuit caused by a penetration into the separator by a flash generated at the electrode is avoided, and the separator is prevented from being torn by an edge of an electrode, when the separator is wrapped around the electrodes. Therefore, a battery can be reliably assembled. Further, moderate voids are maintained in the separator after wrapping the electrodes, and an electrolyte can be held for a long time. Therefore, a battery having a long lifetime can be assembled.

The term "Young's modulus" as used herein means an apparent Young's modulus calculated from an initial tensile strength determined in accordance with a method defined in JIS (Japanese Industrial Standard) L 1015:1999, 8.11. The initial tensile strength is determined by a tester of a constant rate of strain type.

The above advantageous effects can be obtained from a higher Young's modulus. The Young's modulus is preferably 65 cN/dtex or more, more preferably 80 cN/dtex or more.

A fiber diameter of the high-modulus fiber is not particularly limited, but is preferably 12 to 35 μm, more preferably 13 to 30 μm, most preferably 13 to 25 μm so that an absolute strength of the nonwoven fabric is enhanced, when the nonwoven fabric is used as the separator, to thereby prevent the flash at the electrode from penetrating the separator, avoid the edge of the electrode from tearing the separator, diminish a unevenness of a resistance to a penetrating force, or suppress an occurrence of a short circuit.

The above advantageous effects may be easily achieved if the high-modulus fibers are contained at an amount of 5 mass % or more, preferably 10 mass % or more, in the fibers forming the nonwoven fabric. On the other hand, it is preferable that the amount of the high-modulus fibers is 98 mass % or less so as not to decrease the amount of the fine fibers having a function to enhance the electrolyte-holding capacity.

A material for the high-modulus fibers is not particularly limited, but is, for example, polyethylene-based resins, such as, ultra-high-molecular-weight polyethylene, high-density polyethylene, middle-density polyethylene, low-density polyethylene, linear low-density polyethylene, or ethylene copolymers, polypropylene-base resin, such as high-crystalline polypropylene, propylene copolymers, or polymethylpentene-based resin, such as polymethylpentene, methylpentene copolymers. Of these resins, ultra-high-molecular-weight polyethylene or high-crystalline polypropylene is preferable.

The high-modulus fiber used in the present invention may be composed of a single component of the above material, or a mixture or a composite of two or more components of the above materials. When the high-modulus fiber is a mixture or composite fiber composed of two or more materials as above, the cross-sectional shape may be, for example, a sheath-core type, an eccentric type, or an islands-in-sea type. When the high-modulus fiber is a mixture or a composite fiber composed of two or more resin components, the high-modulus fibers may be fused to each other at the resin components constituting the surface thereof.

The nonwoven fabric used for the battery separator of the present invention contains fine fibers having a fiber diameter of 4 μm or less, preferably 3 μm or less, more preferably 2 μm or less. Therefore, the nonwoven fabric has a wide apparent total surface area of fibers per a surface density, and can provide a separator having an excellent electrolyte-holding capacity, even though the separator is thin.

For the fine fibers contained in the nonwoven fabric used for the battery separator of the present invention, it is preferable that the fiber diameters of all of the fine fibers are distributed within a narrow range, and a fiber diameter of each fine fiber is nearly identical to the other. This is because when the fiber diameter of each fine fiber is nearly identical, pores having a uniform pore diameter and internal spaces having a uniform size are formed, and thus, the electrolyte is uniformly distributed. Specifically, a ratio ($\sigma/d$), i.e., a quotient obtained by dividing a standard deviation ($\sigma$) of a distribution of fiber diameters of the fine fibers by a mean value ($d$) of fiber diameters of the fine fibers, is preferably 0.2 or less, more preferably 0.18 or less. If all of the fiber diameters of the fine fibers are identical, a standard deviation ($\sigma$) becomes zero, and the lower limit of the ratio ($\sigma/d$) is zero.

The "mean value ($d$) of fiber diameters of the fine fibers" is a value obtained by taking an electron micrograph of a sample of the nonwoven fabric, determining fiber diameters of 100 or more fine fibers on the electron micrograph, and taking an average of the 100 or more determined fiber diameters. The standard deviation ($\sigma$) of the fine fibers can be calculated from each fiber diameter ($\chi$) of fine fiber and the number (n; at least 100) of the determined fine fibers, using an equation:

$$\text{Standard deviation} = \{(n\Sigma\chi^2 - (\Sigma\chi)^2)/n(n-1)\}^{1/2}$$

wherein n denotes the number of the determined fine fibers, and $\chi$ denotes a fiber diameter of each fine fiber.

If the nonwoven fabric contains two or more groups of fine fibers having a fiber diameter of 4 μm or less with respect to the distribution of the fiber diameter, preferably each group satisfies the above equation.

Further, it is preferable that each of the fine fibers has a diameter that does not substantially change in an axial direction of the fiber, namely, has a substantially same diameter, so that the nonwoven fabric containing pores having a uniform pore diameter and internal spaces having a uniform size can be formed.

The fine fibers having a substantially same diameter that does not substantially change in an axial direction of the fiber, or the fine fibers having nearly identical fiber diameters in plural fine fibers may be prepared, for example, by removing sea components from islands-in-sea type composite fibers obtained by a composite spinning method, such as a method for extruding and compositing island components into sea components under the condition that a spinning nozzle is controlled. It is generally difficult to obtain fine fibers having a substantially same diameter that does not substantially change in an axial direction of the fiber, or fine fibers having nearly identical fiber diameters in plural fine fibers, by a method called a mixing spinning method, that is, a method for mixing resins for island components and resins for sea components, then spinning the product to obtain islands-in-sea type fibers, and removing the sea components therefrom. It is also generally difficult to obtain fine fibers having a substantially same diameter that does not substantially change in an axial direction of the fiber, or fine fibers having nearly identical fiber diameters in plural fine fibers, by a method called a melt-blowing method.

Preferably, the cross-sectional shape of the fine fiber is circle, because the uniformity of the nonwoven fabric can be further improved. Further, if the nonwoven fabric contains bundles of the fine fibers, the uniformity of the nonwoven fabric is lowered. The bundle is liable to be produced by dividing dividable fibers after forming a nonwoven fabric containing dividable fibers. Therefore, it is preferable to ensure the nonexistence of such a bundle.

Preferably, the fine fibers are made from polyolefin resins, for example, polyethylene-based resins, such as, ultra-high-molecular-weight polyethylene, high-density polyethylene, middle-density polyethylene, low-density polyethylene, linear low-density polyethylene, or ethylene copolymers, polypropylene-base resin, such as polypropylene, or propylene copolymers, or polymethylpentene-based resin, such as polymethylpentene, methylpentene copolymers, of these resins, polypropylene-based resin or polyethylene-based resin is preferable.

It is preferable that the fine fiber contains a resin component capable of participating in fusion (hereinafter sometimes referred to as a fusible component), because the fine fibers may be firmly fixed to avoid a dropping or raising of the fibers, when the fine fibers are fused by the fusible components.

If it is desirable to fuse the fine fibers, the fine fibers may be composed of only the fusible component of the above polyolefin-based resin, or two or more components, for example, the fusible component and a component (hereinafter sometimes referred to as a non-fusible component) having a melting point higher than that of the fusible component. It is more preferable that the fine fiber is composed of two or more components, for example, the fusible component and the non-fusible component, because a form or shape of the fine fiber may be maintained due to the presence of the non-fusible component, and thus, interference to the intrinsic function of the fine fiber may not occur, i.e., interference to the formation of pores having a uniform pore diameter and internal spaces having a uniform size may not occur, when the fusible components are fused.

When the fine fiber is composed of two or more components, the fusible component preferably occupies a part of or all of the surface of the fine fiber, and thus can take part in the fusion. When the fine fiber is a composite fiber composed of two or more components, the cross-sectional shape is, for example, preferably a sheath-core type, an eccentric type, or an islands-in-sea type. The non-fusible component has a melting point higher than that of the fusible component, preferably by 10° C. or more, more preferably by 20° C., or more, so that the form or shape of the fine fibers can be maintained by the non-fusiblecomponent.

The composite fine fiber composed of two or more components, such as the fusible component and the non-fusible component, may be prepared by a method wherein a nozzle capable of producing the above-mentioned cross-sectional shape (such as a sheath-core type, an eccentric type, or an islands-in-sea type) is used as the nozzle for island components and spun to the islands-in-sea type composite fibers when spinning the islands-in-sea type composite fibers in a conventional composite spinning method, or a method wherein a resin mixture of two or more resin components is supplied to a nozzle for the island component and spun to the islands-in-sea type composite fibers when spinning the islands-in-sea type composite fibers in a conventional composite spinning method, and then the sea component is removed therefrom.

The term "melting point" as used herein means a temperature of a maximum value in a melting-endothermic curve obtained by raising a temperature from room temperature at a rate of 10° C./min, using a differential scanning calorimeter. When there are two or more maximum values, the highest value is the melting point.

The above-mentioned advantageous effects can be easily achieved when the fine fibers account for 2 mass % or more (more preferably 5 mass % or more, most preferably 10 mass % or more) in the fibers forming the nonwoven fabric. The nonwoven fabric used for the battery separator of the present invention may be composed only of the fine fibers, but preferably contains the above high-modulus fibers, to thus maintain moderate voids. Therefore, the higher limit of the amount of the fine fibers is 95 mass %.

The fine fiber is preferably a short fiber having a fiber length of 30 mm or less and a high level of freedom, so that it is easily and uniformly dispersed in the process for manufacturing the nonwoven fabric. If the fine fibers or the island components in the islands-in-sea type composite fibers are press-bonded to each other when they are cut, the resulting fibers become like the fibrillated fibers. Therefore, it is preferable to use the fine fibers which are hard to press-bond to each other when cut, or the islands-in-sea type composite fibers containing the island components which are hard to press-bond to each other when cut.

For example, a high-crystalline resin may be used as a material for the fine fibers hard to press-bond or the island components (in the islands-in-sea type composite fibers) hard to press-bond. Specifically, it is preferable to use polymethylpentene or polypropylene having a melting point of 166° C. or more, more preferably 168° C. or more.

The nonwoven fabric used for the battery separator of the present invention may further contain fusible fibers, to enhance the strength of the nonwoven fabric.

The fusible component in the fusible fiber preferably has a melting point that does not affect the fibers such as the high-modulus fiber and/or the fine fibers other than the fusible fibers. For example, when Al the high-modulus fibers composed only of polypropylene-based resin and the fine fibers composed only of polypropylene-based resin are contained as the fibers other than the fusible fibers, the fusible fibers preferably contain polyethylene-based resins, such as, ultra-high-molecular-weight polyethylene, high-density polyethylene, middle-density polyethylene, low-density polyethylene, linear low-density polyethylene, or ethylene copolymers as the fusible component. Further, when the high-modulus fibers composed only of ultra-high-molecular-weight polyethylene and the fine fibers composed only of polypropylene-based resin are contained as the fibers other than the fusible fibers, the fusible fibers preferably contain polyethylene, such as, high-density polyethylene, middle-density polyethylene, low-density polyethylene, linear low-density polyethylene, or ethylene copolymers as the fusible component.

When the nonwoven fabric used for the battery separator of the present invention contains the fine fibers, the high-modulus fibers, and the fusible fibers, and the resin forming the surfaces of the fine fibers and the high-modulus fibers is only the polypropylene-based resin, it is preferable to use the fusible fibers containing polypropylene copolymer (such as ethylene-butene-propylene copolymer, ethylene-butadiene-propylene copolymer, or ethylene-propylene copolymer) as the fusible component so that the nonwoven fabric having a high fusing property of the fibers, an excellent mechanical strength (including a high resistance to tearing by the electrode, or a high strength against puncturing by a flash), and an excellent resistance to heat, can be prepared.

The fusible fiber may be composed of only the fusible component, or may contain the non-fusible component having a melting point higher than that of the fusible component in addition to the fusible component. When the fusible fibers are composite fibers composed of the fusible component and the non-fusible component as above, the strength of the nonwoven fabric can be enhanced. The cross-sectional shape of the composite fiber may be, for example, a sheath-core type, an eccentric type, or an islands-in-sea type. Further, the non-fusible component is preferably composed of the resin having a melting point higher than that of the fusible component, preferably by 10° C. or more, more preferably 20° C. or more.

The fusible fibers are contained at an amount of preferably 20 mass % or more, more preferably 40 mass % or more in the fibers forming the nonwoven fabric, so that the strength of the nonwoven fabric can be enhanced. On the other hand, an amount of the fusible fibers is preferably 98 mass % or less because of the necessary existence of the fine fibers as above.

The nonwoven fabric used for the battery separator of the present invention may be composed of only the fine fibers having a fiber diameter of 4 μm or less, as above. Further, the nonwoven fabric may be composed of a combination of the fine fibers and the high-modulus fibers, a combination of the fine fibers and the fusible fibers, or a combination of the fine fibers, the high-modulus fibers, and the fusible fibers. Furthermore, the nonwoven fabric may contain, in addition to the fine fibers, the high-modulus fibers, and the fusible fibers, usual fibers to which the above definitions thereof do not apply. Namely, the usual fibers, such as regular polypropylene fiber, have a fiber diameter of more than 4 μm and a Young's modulus of less than 50 cN/dtex, and do not contain a fusible component. The usual fibers may be contained at an amount of about 93 mass % or less, preferably 60 mass % or less, with respect to a total mass of the nonwoven fabric used for the battery separator of the present invention.

When the nonwoven fabric used for the battery separator of the present invention is composed of a combination of the fine fibers and the high-modulus fibers, a combination ratio (the fine fibers:the high-modulus fibers) in terms of mass is not particularly limited, but may be, for example, 50 to 90:50 to 10, more preferably 60 to 80:40 to 20, most preferably 65 to 80:35 to 20.

When the nonwoven fabric used for the battery separator of the present invention is composed of a combination of the fine fibers and the fusible fibers, a combination ratio (the fine fibers:the fusible fibers) in terms of mass is not particularly limited, but may be, for example, 10 to 80:90 to 20, more preferably 10 to 50:90 to 50, most preferably 10 to 30:90 to 70.

When the nonwoven fabric used for the battery separator of the present invention is composed of a combination of the fine fibers, the high-modulus fibers, and the fusible fibers, a combination ratio (the fine fiber:the high-modulus fibers:the fusible fibers) in terms of mass is not particularly limited, but may be, for example, 10 to 40:15 to 40:20 to 75, more preferably 10 to 40:20 to 40:20 to 70, most preferably 10 to 30:20 to 35:40 to 65.

When the nonwoven fabric used for the battery separator of the present invention contains the fine fibers and the high-modulus fibers, the average fiber diameter of the high-modulus fibers is preferably 5 times or more, more preferably 6 times or more, most preferably 6.5 times or more, the average fiber diameter of the fine fibers. The nonwoven fabric containing the fine fibers and the high-modulus fibers is liable to have a structure such that the thick high-modulus fibers form a skeleton and the fine fibers are located between the skeleton. If the diameter of the high-modulus fibers is 5 times or more the diameter of the fine fibers, the nonwoven fabric may effectively maintain spaces therein due to the high elasticity of the high-modulus fibers, a void rate under pressure is enhanced, and thus the electrolyte-holding capacity is also enhanced.

Similar advantageous effects can be obtained, when an average length of the high-modulus fibers is 2.5 times or more, preferably 3 times or more, more preferably 4 times or more, most preferably 5 times or more an average fiber length of the fine fibers. Further, when the average length of the high-modulus fibers is 10 μm or more, similar advantageous effects can be achieved by arranging a mass ratio of the high-modulus fibers in the nonwoven fabric 1 to 2.5 times a mass ratio of the fine fibers therein.

When all of the surfaces of the fibers forming the nonwoven fabric used for the battery separator of the present invention are composed of the propylene-based resin, a nonwoven fabric having a high fusing property of the fibers, an excellent mechanical strength (including the resistance to tearing by the electrode, or strength against puncturing by a flash), and an excellent resistance to heat can be prepared. Further, when all the fusible components of the fibers forming the nonwoven fabric are composed of the ethylene-based resin, a nonwoven fabric having a high fusing property of the fibers, and an excellent mechanical strength (including the resistance to tearing by the electrode, or strength against puncturing by a flash) can be prepared.

The fibers, such as the high-modulus fibers, the fine fibers, the fusible fibers, or the usual fibers, forming the nonwoven fabric used for the battery separator of the present invention may be undrawn, but preferably are drawn because a good mechanical strength is thus obtained.

The fiber length of the fibers, such as the high-modulus fibers, the fine fibers, the fusible fibers, or the usual fibers, forming the nonwoven fabric used for the battery separator of the present invention is not particularly limited, but is preferably 0.5 to 30 mm, because a shorter fiber length brings a higher level of freedom of the fibers, and the fibers may be uniformly dispersed in the process for manufacturing the nonwoven fabric. More preferably, fibers cut to a length of 1 to 20 mm are used. The term "fiber length" as used herein means a value measured in accordance with JIS L1015 (a testing method for man-made staple fibers), the B method (an amended method for staple diagram). The average fiber length is an average of 100 fibers.

The nonwoven fabric used for the battery separator of the present invention has an apparent total surface area of fibers per a surface density of 20 $m^2$ or more. Therefore, the nonwoven fabric has an excellent electrolyte-holding capacity and can hold the electrolyte for a long term even if the thickness of the separator is 0.1 mm or less. The apparent total surface area of fibers per a surface density is preferably 22 $m^2$ or more, more preferably 25 $m^2$ or more.

The term "surface density" as used herein means a basis weight determined in accordance with a method defined in JIS P 8124 (Paper and paperboard; a method for measuring basis weight). The term "apparent total surface area of fibers per a surface density" as used herein means a sum of the surfaces area (except cross-sectional areas at both ends) of the fibers present in the above "surface density" under the condition that the fibers have not been fixed to each other. For example, when the surface density is 40 $g/m^2$, an amount of the fine fibers is 20 mass %, and an amount of the fusible fibers is 80 mass %, the "apparent total surface area of fibers per a surface density" is a sum of the surface area of 8 g (=40×0.2) of the fine fibers (except cross-sectional areas at both ends) and the surface area of 32 g(=40×0.8) of the fusible fibers (except cross-sectional areas at both ends). When the nonwoven fabric contains the fusible fibers, they are fused. However, the "apparent total surface area" is calculated on the basis of the surface area (except cross-sectional areas at both ends) of the fusible fibers before fusing. The surface area of the fiber can be calculated from the fiber diameter, the surface density, the combination ratio, and the fineness. The surface area of the fusible fiber before fusing can be calculated from fiber diameter of the unfused portion thereof.

The thickness of the nonwoven fabric used for the battery separator of the present invention is 0.1 mm or less. As the nonwoven fabric is thin, it can be applied to the enhancement of the capacity of the battery. A lower limit of the thickness is not particularly limited, so long as the electrodes are satisfactorily separated from each other, and the electrolyte is satisfactorily maintained when the nonwoven fabric is used as the separator. If the thickness is less than about 0.005 mm, a minute current is liable to run there through, or the electrolyte-holding capacity is liable to be lowered. Therefore, the thickness is preferably about 0.005 mm or more, more preferably about 0.01 mm or more. The term "thickness" as used herein means an average of 10 thicknesses randomly selected and determined in accordance with a method defined in JIS C2111 5.1(1), using an outside micrometer (0 to 25 mm) described in JIS B 7502:1994.

In the nonwoven fabric used for the battery separator of the present invention, it is preferable that the fibers are fixed substantially only by a fusion of the fibers to each other. When the fibers are fixed only by the fusion, the arrangement of the fibers is not disturbed. Therefore, a separator having a good uniformity, capable of effectively preventing a short circuit, capable of uniformly distributing the electrolyte, and having a lower inner resistance can be prepared. For example, when the fibers are fixed to each other by an entanglement, through holes are liable to be formed from the face side to the rear side of the nonwoven fabric, by an action for entangling the fibers to each other, by a fluid jet such as a water jet, or by needle punching, and thus, a short circuit is easily caused. On the contrary, if the fibers are fixed only by the fusion, the arrangement of the fibers is not disturbed when fused, and thus, a short circuit is rarely caused.

When a nonwoven fabric is prepared without an entangling treatment, some fibers are entangled to each other. For example, a fiber web prepared by a card or a wet-laid method can maintain a shape thereof. This means that the fibers are entangled more or less in the fiber web. However, the entanglement does not disturb the fibers arrangement in the fiber web as in the above hydroentanglement or needle punching, and thus is not regarded as a substantial entanglement in the present invention. As above, the expression "substantially only by fusion of the fibers" as used herein means the condition wherein the fibers are fixed to each other only by fusion, after forming a fiber web. From another aspect, the above condition may be defined as the condition wherein the fibers, i.e., the fine fibers, and for example, the high-modulus fibers, the fusible fibers, and/or the usual fibers, forming the nonwoven fabric are substantially two-dimensionally arranged.

The nonwoven fabric used for the battery separator of the present invention has a uniformity index of 0.15 or less. Thus, the nonwoven fabric has an excellent uniformity, is capable of effectively preventing a short circuit, and can uniformly hold the electrolyte. Preferably, the uniformity index is 0.10 or less.

The "uniformity index" is calculated by a method disclosed in Japanese Unexamined Patent Publication (Kokai) No. 2001-50902. Specifically, the "uniformity index" is calculated by the following method wherein:

(1) Brightness information is obtained by irradiating a nonwoven sample with light from an illuminant, and receiving a reflected light from a predetermined region of the sample at a light-receptor element;

(2) Four divisional patterns having an image size of 3 mm × 3 mm, 6 mm × 6 mm, 12 mm × 12 mm, and 24 mm × 24 mm are obtained by equally dividing the predetermined region of the sample;

(3) A brightness value of each zone in the resulting divisional patterns is calculated on the basis of the brightness information;

(4) An average brightness (X) of each divisional pattern is calculated on the basis of the brightness value of each zone;

(5) A standard deviation ($\sigma$) of each divisional pattern is calculated;

(6) A coefficient of variation (CV) of each divisional pattern is calculated from an equation:

Coefficient of Variation (CV)=($\sigma$/X)×100 wherein $\sigma$ denotes a standard deviation of each divisional pattern, and X denotes an average brightness of each divisional pattern;

(7) A group of coordinates having an X axis of a logarithm of each image size and a Y axis of a coefficient of variation of the corresponding image size is made, and regressed to a primary line by a method of least squares to calculate a slope thereof. An absolute value of the resulting slope is a uniformity index.

In the nonwoven fabric used for the battery separator of the present invention, a maximum pore size is preferably 40 µm or less, because the uniformity of the nonwoven fabric thus becomes excellent, and if the separator of the nonwoven fabric is strongly pressed against the electrodes, loose powdery active materials hardly invade the inner voids in the separator, and a short circuit is effectively prevented. The maximum pore size in the nonwoven fabric is more preferably 35 µm or less, most preferably 30 µm or less. The term "maximum pore size" as used herein means a value measured in accordance with a bubble point method, using a porometer (Coulter Electronics Ltd.).

In the nonwoven fabric used for the battery separator of the present invention, the maximum pore size of the pores in the nonwoven fabric is preferably 2 times or less, more preferably 1.9 times or less a mean flow pore size. Within the above range, the nonwoven fabric has a narrow distribution of the pore size, and an electrolyte can be uniformly dispersed, to thereby assemble a battery having a low internal resistance. Ideally the maximum pore size of the pores in the nonwoven fabric is 1 times the mean flow pore size, namely, all of the pores have the same size. The term "mean flow pore size" as used herein means a value defined in ASTM-F316, and measured, for example, in accordance with a mean-flow point method, using a porometer (Coulter Electronics Ltd.).

The void rate of the nonwoven fabric used for the battery separator of the present invention is preferably 45 to 65%, more preferably 50 to 60% so that the internal resistance and the inner pressure are lowered, and the electrolyte-holding capacity is enhanced.

The void rate (P) is calculated by an equation:

$$\text{Void rate (P)} = \{1 - W/(T \times d)\} \times 100$$

wherein W denotes a surface density (g/m²), T denotes a thickness (μm) of the nonwoven fabric (or a separator), and d denotes a density (g/cm³) of the resin (for example, a fiber) forming the nonwoven fabric. When the nonwoven fabric contains two or more kinds of resins, the density of the constituent resins is an average of masses of the constituent resins. For example, when there are $\underline{a}$ mass % of a resin A having a density $d_1$, and b mass % of a resin B having a density $d_2$, the density (d) of the constituent resins is calculated from an equation:

$$\text{Density (d)} = d_1 \times a/100 + d_2 \times b/100.$$

It is preferable that a tensile strength in at least one direction of the nonwoven fabric used for the battery separator of the present invention is 20 N/5 cm width or more, because an electrode group can be thus assembled without breakage, and a battery can be assembled with a good yield when used as a separator. The tensile strength is more preferably 30 N/5 cm width or more, most preferably 40 N/5 cm width or more.

The "tensile strength" means a power required to break a nonwoven fabric sample (a separator sample) when a sample cut to a 5 cm width is set between chucks (distance between the chucks=10 cm) of a tensile tester (TENSILON UTM-III-100; manufactured by ORIENTEC, Co.), and the sample is pulled at a pulling rate of 300 mm/min.

A resistance to needle-penetration of the nonwoven fabric used for the battery separator of the present invention is preferably 500 gf or more. If the resistance to needle-penetration is less than 500 gf, the fibers forming the nonwoven fabric are separated by a flash from the electrode when the nonwoven fabric is used as the separator, and a short circuit is easily caused when a group of electrodes is formed. The resistance to needle-penetration is more preferably 600 gf or more, most preferably 700 gf or more.

The resistance to needle-penetration is measured as follows:

A nonwoven sample is mounted on a supporting cylinder with a through hole (inner diameter=11 mm) having a circular sectional shape, so that the through hole is covered with the sample. Further, a fixing cylinder with a through hole (inner diameter=11 mm) having a circular sectional shape is mounted on the sample, so that the center of the fixing cylinder conforms to the center of the through hole of the supporting cylinder, to thereby fix the sample. Then, a needle (curvature radius=0.5 mm at the tip; diameter=1 mm, a length projected from a jig=2 cm) set on a handy-type compression tester (KES-G5; manufactured by KATO TECH Co., Ltd.) is thrust perpendicularly into the sample at a rate of 0.01 cm/s, and a force required to pierce the sample with the needle is measured. The force required gives the resistance to needle-penetration of the sample.

The nonwoven fabric used for the battery separator of the present invention has an average resistance to needle-penetration per unit surface density of preferably 14 gf or more, more preferably 15 gf or more, still more preferably 16 gf or more, most preferably 18 gf or more. When the nonwoven fabric does not contain a through hole, the fibers are uniformly dispersed therein and the uniformity thereof is excellent, the average resistance to needle-penetration per unit surface density is increased. The average resistance to needle-penetration is an average of values obtained when the resistance to needle-penetration is measured at 30 points in the nonwoven fabric. The average resistance to needle-penetration per unit surface density is a quotient obtained by dividing the average resistance to needle-penetration by the surface density (g/m²).

The surface density of the nonwoven fabric used for the battery separator of the present invention is preferably 5 to 55 g/m², more preferably 10 to 40 g/m².

It is preferable to introduce one or more oxygen-and/or sulfur-containing functional groups such as sulfonic acid group, sulfate group, sulfofluoride group, hydroxyl group, carboxyl group, or carbonyl group, onto the surfaces of the fibers constituting the nonwoven fabric used for the battery separator of the present invention; to graft-polymerize one or more hydrophilic monomers on the surfaces; to apply one or more surface-active agents to the surfaces; or to apply one or more hydrophilic resin to the surfaces; so that an affinity thereof to an electrolyte is imparted or enhanced.

The nonwoven fabric used for the battery separator of the present invention can be used, for example, as a separator of a primary battery, such as an alkaline-manganese battery, a mercury battery, a silver oxide battery, an air battery, or the like, or a secondary battery, such as a nickel-cadmium battery, silver-zinc battery, silver-cadmium battery, nickel-zinc battery, nickel-hydrogen battery, lead storage battery or the like, particularly a separator of a nickel-cadmium battery, nickel-hydrogen battery, or lead storage battery.

The nonwoven fabric used for the battery separator of the present invention may be prepared, for example, by a following method:

A surface density (g/m²) is first designed. Then, on the basis of the designed surface density, a fiber combination is determined so that an apparent total surface area of fibers per a surface density of a desired nonwoven fabric becomes 20 m² m or more. In general, the above requirement is easily satisfied when the fine fibers are contained in a large amount. Further, if non-fibrillated fibers are used as the fibers, a separator having a good uniformity and capable of uniformly holding an electrolyte can be easily prepared. It is preferable to select substantially only polyolefin-based fibers having an excellent resistance to an electrolyte, i.e., preferably the above-mentioned high-modulus fibers, the above-mentioned fine fibers, and the above-mentioned fusible fibers.

Thereafter, a fiber web is formed from the selected fibers. The method for preparing the fiber web is not particularly limited, but the fiber web may be prepared by a dry-laid method, such as a carding method, an air-laid method, a spun-bonding method, or a melt-blown method, or a wet-laid method. Of these methods, the wet-laid method is preferable, because the nonwoven fabric having a property of a uniform dispersal of fibers and an easiness of uniformly holding an electrolyte may be easily prepared. As the wet-laid method, there may be mentioned conventional methods, such as a flat long-wire type, an inclined short-wire type, a cylindrical type, or a long-wire/cylindrical type.

Then, the fibers constituting the fiber web may be fixed to each other to obtain the nonwoven fabric used for the battery separator of the present invention. The fixation of the fibers is preferably carried out only by fusion. When the fibers are fixed only by fusion, the arrangement of the fibers is not disturbed. Therefore, a separator having a good uniformity, capable of effectively preventing a short circuit, capable of uniformly distributing the electrolyte, and having a lower inner resistance can be easily prepared. Therefore, the fiber web preferably contains the fusible fibers as the constituent fibers.

The fusing step of the fiber web may be carried out without or with an applied pressure. Alternatively, the fusible components may be melted without an applied pressure, and then (preferably immediately thereafter) the web may be pressed.

A heating temperature in each case is preferably from a softening point of the fusible component of the fusible fibers to a temperature higher than a melting point of the fusible component of the fusible fibers by 30° C. It is preferable to adjust a pressure when applied so that the void rate of the resulting nonwoven fabric becomes 45 to 65%, and the tensile strength of the resulting nonwoven fabric becomes 20 N/5 cm width or more in at least one direction.

The term "softening point" as used herein means a temperature of a starting point in a melting-endothermic curve obtained by raising a temperature from room temperature at a rate of 10° C./min, using a differential scanning calorimeter.

The nonwoven fabric used for the battery separator of the present invention can be used to enhance the battery capacity because of the thinness thereof. Therefore, if the thickness of the fiber web after fusing is more than 0.1 mm, the thickness is adjusted to 0.1 mm or less by, for example, passing the web through a pair of rolls.

The nonwoven fabric having a uniformity index of 0.15 or less, a maximum pore size of 40 μm or less, and/or a maximum pore size that is 2 times or less the mean flow pore size may be prepared by a method wherein the non-fibrillated fibers are used, a method wherein the fine fibers having a circular cross-sectional shape are used, a method wherein short fibers having a fiber length of 1 to 20 mm are used, a method wherein the fiber web is produced by the wet-laid method, or a method wherein the fibers are fixed only by fusion without an entanglement, or by a combination of two or more methods as above.

The nonwoven fabric having a void rate of 45 to 65% may be prepared by a method wherein an amount of the fine fibers used is reduced, a method wherein an amount of all of the fibers used is reduced, or a method wherein a pressure applied when fusing is adjusted to increase the thickness, or by a combination of two or more methods as above.

The nonwoven fabric having a tensile strength of 20 N/5 cm width or more in at least one direction may be prepared by a method wherein the fibers are oriented into one direction by adjusting an amount of a flow of slurry and a moving rate of a net taking up the fibers, a method wherein a degree of fusion is increased, or a method wherein the fibers having a long fiber length are used, or by a combination of two or more methods as above.

The nonwoven fabric having a resistance to needle-penetration of 500 gf width or more, or an average resistance to needle-penetration per unit surface density of 14 gf or more may be prepared by a method wherein the high-modulus fibers having a high Young's modulus are used, a method wherein an amount of high-modulus fibers used is increased, a method wherein the high-modulus fibers are uniformly dispersed, a method wherein a tight fusion by the fusible fibers is carried out, a method wherein the fusible fibers are melted and immediately thereafter pressed to cause a fusion, or by a combination of two or more methods as above.

The nonwoven fabric prepared by the above method has a substantially unilayered structure, an apparent total surface area of fibers per a surface density of 20 m$^2$ or more, and a thickness of 0.1 mm or less. Therefore, when the nonwoven fabric is used as the separator, a battery capable of uniformly holding the electrolyte throughout the separator, and having a low inner pressure and a high capacity can be assembled. Further, a battery having a good electrolyte-holding capacity, particularly, a long-term electrolyte-holding capacity, and thus a long-term lifetime, can be assembled.

In a preferred embodiment of the nonwoven fabric used for the battery separator of the present invention, the fibers are composed only of the polyolefin-based fibers, to obtain an excellent resistance to electrolyte. Therefore, it is preferable to carry out a treatment for imparting a hydrophilic property, to enhance the electrolyte-holding capacity. The treatment for imparting a hydrophilic property may be, for example, a sulfonating treatment, a treatment with fluorine gas, a graft polymerization treatment with vinyl monomers, a treatment with a surface-active agent, a discharging treatment, or a treatment to adhere hydrophilic resins.

The sulfonating treatment contains, for example, but is not limited to, a method for introducing sulfonic acid groups into the nonwoven fabric by dipping the nonwoven fabric in a solution of fuming sulfuric acid, sulfuric acid, sulfur trioxide, chlorosulfuric acid, or sulfuryl chloride, or a method for introducing sulfonic acid groups into the nonwoven fabric by subjecting a discharging treatment to the nonwoven fabric in the presence of sulfur monooxide gas, sulfur dioxide gas, sulfur trioxide gas or the like.

The treatment with fluorine gas is not limited. For example, a hydophilic property can be imparted to the fiber surfaces of the nonwoven fabric by exposing the nonwoven fabric to a gas mixture of fluorine gas diluted with an inactive gas (such as nitrogen or argon) and at least one gas selected from a group consisting of oxygen, carbon dioxide and sulfur dioxide gases. A permanent hydrophilic property can be more effectively imparted by adhering sulfur dioxide gas to the nonwoven fabric, and then bringing the nonwoven fabric into contact with fluorine gas.

Examples of the vinyl monomer which may be used in the graft polymerization with vinyl monomers are acrylic acid, methacrylic acid, acrylate, methacrylate, vinyl pyridine, vinyl pyrrolidone, or styrene. When styrene is graft polymerized, it is preferable to carry out a sulfonation, to impart an affinity with an electrolyte. Of these monomers, acrylic acid has a good affinity with an electrolyte and may be preferably used.

A method for polymerizing the vinyl monomers is, for example, a method for dipping the nonwoven fabric in a solution containing the vinyl monomers and an initiator, and heating; a method for coating the nonwoven fabric with vinyl monomers and applying radiation; a method for applying radiation to the nonwoven fabric and then bringing the nonwoven fabric into contact with the vinyl monomers; a method for impregnating the nonwoven fabric with a solution containing vinyl monomers and a sensitizing agent, and applying ultraviolet rays. The graft polymerization can be effectively carried out by modifying the surface of fibers with ultraviolet radiation, a corona discharge or a plasma discharge before bringing the nonwoven fabric into contact with the vinyl monomer solution, to enhance the affinity thereof with the vinyl monomer solution.

The treatment with a surface-active agent may be carried out, for example, by coating or spraying a solution of an anionic surface-active agent (such as an alkali metal salt of a higher fatty acid, alkyl sulfonate, or a salt of sulfosuccinate) or a nonionic surface-active agent (such as polyoxyethylene alkyl ether, or polyoxyethylene alkylphenol ether) to the nonwoven fabric, or dipping the nonwoven fabric in the solution.

As the discharging treatment, there may be mentioned, for example, treatments with a corona discharge, plasma glow discharge, surface discharge, or electron rays. Of the discharging treatments, a method comprising the steps of placing the nonwoven fabric between a pair of electrodes carrying a dielectric layer respectively in air under an atmospheric pressure, so that the nonwoven fabric is brought into contact with both dielectric layers, and then applying an alternating current voltage between the electrodes to thereby induce an electric discharge in internal voids contained in the nonwoven fabric, can be preferably conducted. This is because not only the outer surfaces but also the insides of the nonwoven fabric can be thus treated; and therefore, a battery having the separator with an excellent electrolyte-holding capacity can be produced from the resulting nonwoven fabric.

The treatment to apply hydrophilic resins can be carried out by adhering hydrophilic resins, such as carboxymethyl cellulose, polyvinyl alcohol, polyvinyl alcohol which is cross-linkable, or polyacrylic acid, to the nonwoven fabric. The hydrophilic resins may be adhered to the nonwoven fabric by coating or spraying the nonwoven fabric with a solution prepared by dissolving or dispersing the hydrophilic resins in an appropriate solvent, or dipping the nonwoven fabric in the solution, and then drying. The amount of the hydrophilic resins adhered is preferably 0.3 to 5 mass % with respect to an amount of the whole separator, so as not to affect the air permeability.

The cross-linkable polyvinyl alcohol is, for example, polyvinyl alcohol substituted by a photosensitive group at a part of hydroxyl groups, particularly polyvinyl alcohol having styryl pyridinium, styryl quinolinium, or styryl benzthiazolinium groups as the photosensitive group. The cross-linking of the cross-linkable polyvinyl alcohols can be carried out by adhering the cross-linkable polyvinyl alcohols to the nonwoven fabric as in the case of other hydrophilic resins and irradiating the cross-linkable polyvinyl alcohols with light. The polyvinyl alcohol substituted by a photosensitive group at a part of hydroxy groups has an excellent resistance to alkalis and contains many hydroxyl groups enabling a formation of chelates with ions, and thus can form chelates with ions before the ions are deposited on electrodes in the form of branches, during charging and/or discharging, to thereby effectively prevent a short circuit between the electrodes.

EXAMPLES

The present invention now will be further illustrated by, but is by no means limited to, the following Examples.

Example 1

As the islands-in-sea type composite fibers, fibers (fineness=1.65 dtex, fiber length=2 mm) having 25 island components of polypropylene in a sea component of poly-L-lactic acid (hereinafter referred to as "PLLA") were prepared by a composite spinning method.

Then, the islands-in-sea type composite fibers were dipped in a bath (temperature=80° C.) of a 10 mass % aqueous solution of sodium hydroxide for 30 minutes, and the sea component, PLLA, in the islands-in-sea type composite fibers was extracted and removed to obtain polypropylene fine fibers (fiber diameter=2 μm, ρ/d=0.083, melting point=172° C., fiber length=2 mm, density=0.91 g/cm$^3$, sectional shape=circle). The resulting polypropylene fine fibers were drawn and not fibrillated. Each of fibers had substantially same diameter in an axial direction thereof.

Further, as the fusible fibers, sheath-core type composite fibers (fineness=0.8 dtex, fiber length=5 mm, mass ratio of the core component and the sheath component=1:1, non-fibrillated, drawn) having a core component (non-fusible component) of polypropylene (melting point=168° C., density=0.91 g/cm$^3$), and a sheath component (fusible component) of high density polyethylene (melting point=135° C., density=0.96 g/cm$^3$) was prepared.

Furthermore, as the high-modulus fibers, fibers (Young's modulus=90 cN/dtex, fineness=1.3 dtex, fiber diameter=13.5, μm, fiber length=10 mm, density=0.91 g/cm$^3$, non-fibrillated, drawn) of high-crystalline polypropylene was prepared.

Then, 20 mass % of the polypropylene fine fibers, 50 mass % of the sheath-core type composite fibers, and 30 mass % of the polypropylene high-modulus fibers were mixed, and a fiber web was formed by a wet-laid method (Horizontal Fourdrinier method) from a dispersed slurry.

Then, the fiber web was allowed to stand in a dryer with an internal air circulation at 135° C. for 3 minutes, to dry the fiber web and thermally fuse the sheath components (high density polyethylene) of the sheath-core type composite fibers, and thus form a fused nonwoven fabric.

Thereafter, the fused nonwoven fabric was dipped in a solution of fuming sulfuric acid (15% $SO_3$) for 2 minutes at 60° C., thoroughly washed with water, and dried to obtain a sulfonated nonwoven fabric having sulfonic acid groups introduced on the fiber surfaces.

Then, the sulfonated nonwoven fabric was calendared to produce a unilayered-structural separator (surface density=40 g/m$^2$, thickness=0.10 mm, apparent total surface area=29.8 m$^2$, the fibers being substantially two-dimensionally arranged, no bundle of the fine fibers).

Example 2

As the islands-in-sea type composite fibers, fibers (fineness=1.65 dtex, fiber length=2 mm) having 25 island components of a mixture of polypropylene and high density polyethylene in a sea component of PLLA were prepared by a composite spinning method.

Then, the islands-in-sea type composite fibers were dipped in a bath (temperature=80° C.) of a 10 mass % aqueous solution of sodium hydroxide for 30 minutes, and the sea component, PLLA, in the islands-in-sea type composite fibers was extracted and removed to obtain polypropylene-high density polyethylene mixed fine fibers (melting point of high density polyethylene=135° C., fiber diameter=2 μm, ρ/d=0.09, fiber length=2 mm, density of polypropylene =0.91 g/cm$^3$, density of high density polyethylene=0.96 g/cm$^3$, mixing ratio of polypropylene and high density polyethylene=1:1, non-fibrillated, drawn, sectional shape of fibers=circle, diameter being substantially the same in an axial direction of each fiber).

Further, the fusible fibers (sheath-core type composite fibers) and the high-modulus fibers were prepared as in Example 1.

Then, 20 mass % of the polypropylene-high density polyethylene mixed fine fibers, 50 mass % of sheath-core type composite fibers, and 30 mass % of polypropylene high-modulus fibers were mixed, and the procedure of Example 1 was repeated to produce a unilayered-structural separator (surface density=40 g/m$^2$, thickness=0.10 mm, apparent total surface area =29.2 m$^2$, the fibers being substantially two-dimensionally arranged, no bundle of the fine fibers) wherein the high density polyethylene components of the polypropylene-high density polyethylene mixed fine fibers and the fusible components of the fusible fibers were fused, and sulfonic acid groups were introduced onto the fiber surfaces.

Example 3

The procedure described in Example 1 was repeated except that, as the fusible fibers, sheath-core type composite fibers (fineness=0.8 dtex, fiber length=5 mm, mass ratio of a core component and a sheath component=1:1, non-fibrillated, drawn) having a core component (non-fusible component) of polypropylene (melting point=161° C., density=0.91 g/cm$^3$), and a sheath component (fusible component) of ethylene-butene-propylene copolymer (melting point=137° C., density=0.92 g/cm$^3$) were used, and a thermal fusion was carried out by a dryer with an internal air circulation at 140° C. for 90 seconds, to prepare a unilayered-structural separator (surface density=40 g/m$^2$, thickness=0.10 mm, apparent total surface area=29.9 m$^2$, the fibers being substantially two-dimensionally arranged, no bundle of the fine fibers).

Comparative Example 1

The fusible fibers (sheath-core type composite fibers) and the high-modulus fibers were prepared as in Example 1.

Then, 65 mass % of the sheath-core type composite fibers and 35 mass % of polypropylene high-modulus fibers were mixed, and a fiber web was formed by a wet-laid method (Horizontal Fourdrinier method) from the dispersed slurry.

Then, the fiber web was allowed to stand in a dryer with an internal air circulation at 135° C. for 3 minutes to dry the fiber web and thermally fuse the sheath components (high density polyethylene) of the sheath-core type composite fibers, and thus form a fused nonwoven fabric (surface density=32 g/m$^2$).

Further, two polypropylene melt-blown nonwoven fabrics having an average fiber diameter of 2 μm and a surface density of 4 g/m$^2$ were prepared.

Then, one of the melt-blown nonwoven fabrics was placed on the fused nonwoven fabric, and the whole was passed through heated rolls at 135° C. to perform a thermal bonding by the sheath components (high density polyethylene) in the sheath-core type composite fibers of the fused nonwoven fabric, and thereby form a one-side-fused fused nonwoven fabric.

Thereafter, the other melt-blown nonwoven fabric was placed on the non-fused surface of the resulting one-side-fused fused nonwoven fabric, and the whole was passed through heated rolls at 135° C. to perform a thermal bonding by the sheath components (high density polyethylene) in the sheath-core type composite fibers of the fused nonwoven fabric and thereby form a both-side-fused nonwoven fabric.

Then, as in Example 1, sulfonic acid groups were introduced to the resulting both-side-fused nonwoven fabric, and the sulfonated fabric was calendared to produce a trilayered-structural separator (surface density=40 g/m$^2$, thickness=0.10 mm, apparent total surface area =29.8 m$^2$).

Comparative Example 2

The fusible fibers (sheath-core type composite fibers) and the high-modulus fibers were prepared as in Example 1.

Then, 70 mass % of the sheath-core type composite fibers and 30 mass % of the polypropylene high-modulus fibers were mixed, and a fiber web was formed by a wet-laid method (Horizontal Fourdrinier method) from the dispersed slurry.

Then, the fiber web was allowed to stand in a dryer with an internal air circulation at 135° C. for 3 minutes to dry the fiber web and thermally fuse the sheath component (high density polyethylene) of the sheath-core type composite fibers, and thus form a fused nonwoven fabric.

Then, as in Example 1, sulfonic acid groups were introduced to the resulting fused nonwoven fabric, and the sulfonated fabric was calendared to produce a unilayered-structural separator (surface density=40 g/m$^2$, thickness=0.10 mm, apparent total surface area=15.5 m$^2$).

Evaluation of Properties (A) Measurement of Uniformity Index

The uniformity index of each separator was determined by the following procedures:

(1) Brightness information was obtained by irradiating a separator sample with light from an illuminant, and receiving a reflected light from a predetermined region of the sample at a light-receptor element;

(2) Four divisional patterns having an image size of 3 mm ×3 mm, 6 mm ×6 mm, 12 mm ×12 mm, and 24 mm ×24 mm were obtained by equally dividing the predetermined region of the sample;

(3) A brightness value of each zone in the resulting divisional patterns was calculated on the basis of the brightness information:

(4) An average brightness (X) of each divisional pattern was calculated on the basis of the brightness value of each zone.

(5) A standard deviation (σ) of each divisional pattern was calculated.

(6) A coefficient of variation (CV) of each divisional pattern was calculated from an equation:

$$\text{Coefficient of Variation (CV)} = (\sigma/X) \times 100$$

wherein σ denotes a standard deviation of each divisional pattern, and X denotes an average brightness of each divisional pattern:

(7) A group of coordinates having an X axis of a logarithm of each image size and a Y axis of a coefficient of variation of the corresponding image size was made, and regressed to a primary line by a method of least squares to calculate a slope thereof. An absolute value of the resulting slope was a uniformity index. A smaller uniformity index indicates that the fibers are more uniformly dispersed.

The results are shown in Table 1. As apparent from Table 1, the separators of the present invention have a small uniformity index of 0.09 or less, and an excellent uniformity. Therefore, it is expected that the separators of the present invention can effectively prevent a short circuit, and uniformly hold the electrolyte.

(B) Measurement of Maximum Pore Size

The maximum pore size of each of the separators was measured in accordance with a bubble point method using a porometer (Coulter Electronics Ltd.). The results are shown in Table 1. As apparent from Table 1, the separators of the present invention have a small maximum pore size of 21 μm or less. Therefore, it is expected that the separators of the present invention have an excellent uniformity and loose powdery active materials can be prevented from moving to the other electrode.

(C) Measurement of Ratio (Maximum Pore Size/mean Flow Pore Size)

The mean flow pore size of each of the separators was measured in accordance with a mean-flow point method, using a porometer (Coulter Electronics Ltd.).

Then, the ratio (maximum pore size/mean flow pore size) was calculated by dividing the maximum pore size obtained in the above item (B) by the mean flow pore size. The results are shown in Table 1. As apparent from Table 1, the separators of the present invention have a small ratio (maximum pore size/mean flow pore size). Therefore, it is expected that the electrolyte can be uniformly dispersed in the separators of the present invention and a battery having a low inner resistance can be assembled.

(D) Measurement of Void Rate

A surface density (W) and a thickness (T) of each of the separators were measured.

Then, a density (d) of the constituent fibers of each of the separators was calculated from the density and the mass ratio of each of the constituent fibers.

Thereafter, the void rate (P) is calculated by an equation:

$$\text{Void rate } (P) = \{1 - W/(T \times d)\} \times 100$$

The results are shown in Table 1. As apparent from Table 1, it is expected that the separators of the present invention have a low inner resistance and inner pressure, and a high electrolyte-holding capacity.

(E) Measurement of Lengthwise Tensile Strength

Each separator sample cut to 5 cm width was set between chucks (distance between the chucks=10 cm) of a tensile tester (TENSILON UTM-III-100; manufactured by ORIENTEC, Co.), the sample was pulled in the lengthwise direction at a pulling rate of 300 mm/min, and a power required to break the separator was measured as the lengthwise tensile strength. The results are shown in Table 1. As apparent from Table 1, it is expected that the separators of the present invention are not broken when a group of electrodes is formed, and therefore, a battery can be assembled in a good yield. When the lengthwise tensile strength is 20 N/5 cm width or more, the separator is not easily broken when a group of electrodes is formed.

(F) Resistance to Needle-penetration

Each separator sample was mounted on a supporting cylinder with a through hole (inner diameter=11 mm) having a circular sectional shape so that the through hole was covered with the separator sample. Further, a fixing cylinder with a through hole (inner diameter=11 mm) having a circular sectional shape was mounted on the sample so that the center of the fixing cylinder conformed to the center of the through hole of the supporting cylinder, to thereby fix the sample. Then, a needle (curvature radius=0.5 mm at the tip; diameter=1 mm, a length projected from a jig=2 cm) set on a handy-type compression tester (KES-G5; manufactured by KATO TECH Co., Ltd.) was thrust perpendicularly into the sample at a rate of 0.01 cm/s, and a force required to pierce the sample with the needle was measured. The required force was taken as the resistance to needle-penetration. The results are shown in Table 1. As apparent from Table 1, it is expected that the fibers constituting the separators of the present invention are not divided by a flash from the electrode when a group of electrodes is formed, and therefore, a short circuit is not easily caused.

The average resistance to needle-penetration was calculated as an average of values when a resistance to needle-penetration is measured at 30 points in the nonwoven fabric. The average resistance to needle-penetration per unit surface density was calculated as a quotient obtained by dividing the average resistance to needle-penetration by the surface density (g/m$^2$). The values are shown in Table 1. The high values indicate that there is no through hole, the fibers are uniformly dispersed, and the uniformity is excellent.

(G) Measurement of Electrical Resistance

Each separator was cut to samples of 35 mm ×35 mm.

Then, an aqueous potassium hydroxide solution having a specific gravity of 1.3 (20° C.) was adsorbed into each sample at a mass the same as that of the sample. The sample was put between two nickel plates (35 mm ×35 mm), and an electrical resistance was measured under a pressure of 5 kgf. The results are shown in Table 1. As apparent from Table 1, the separators of the present invention have a low electrical resistance, and can be applied to being an enhancement of the battery capacity.

(H) Measurement of Holding Capacity of Liquid Under Pressure

Each separator was cut to samples of 30 mm ×30 mm. Each of the samples was allowed to stand at 20° C. and a relative humidity of 65% to a moisture equilibrium, and then a mass ($M_0$) thereof was measured.

Then, each of the samples was dipped in an aqueous potassium hydroxide solution having a specific gravity of 1.3 (20° C.) for 1 hour, to replace air in the sample with the aqueous potassium hydroxide solution, and the aqueous potassium hydroxide solution was maintained in the sample.

Thereafter, each of the samples was put between two sets of three filter papers (diameter=30 mm), and a pressure of 5.7 Mpa was applied for 30 seconds by a pressure pump, and a mass ($M_1$) thereof was measured.

A holding capacity of liquid under pressure (HCUP) was calculated by the following equation:

$$\text{HCUP}(\%) = \{(M_1 - M_0)/M_0\} \times 100$$

The measurements were conducted 4 times for each sample, and an average was calculated as the holding capacity of liquid under pressure. The results are shown in Table 1. As apparent from Table 1, it is expected that the separators of the present invention have an excellent electrolyte-holding capacity, and a battery having a long lifetime can be assembled.

TABLE 1

|  | Example 1 | Example 2 | Example 3 | Comparative Example 1 | Comparative Example 2 |
|---|---|---|---|---|---|
| Surface density (g/m$^2$) | 40 | 40 | 40 | 40 | 40 |
| Thickness (mm) | 0.1 | 0.1 | 0.1 | 0.1 | 0.1 |
| Apparent total surface area (m$^2$) | 29.8 | 29.2 | 29.9 | 29.8 | 15.5 |
| Uniformity index | 0.08 | 0.09 | 0.08 | 0.12 | 0.14 |
| Maximum pore Size (μm) | 20.5 | 21 | 20.5 | 26.9 | 47.1 |
| Ratio (1) | 1.7 | 1.8 | 1.7 | 2 | 2.2 |
| Void rate (%) | 56.8 | 56.8 | 56.3 | 56.8 | 56.8 |
| Tensile strength (N/5 cm width) | 73 | 82 | 100 | 96 | 102 |
| Resistance to penetration (2) (gf) | 760 (19) | 772 (19.3) | 840 (21) | 525 (13.1) | 552 (13.8) |
| Electrical resistance (Ω) | 0.2 | 0.23 | 0.2 | 0.61 | 0.26 |
| Holding capacity of liquid under pressure (%) | 10.9 | 9.8 | 11 | 8.9 | 6.5 |

INDUSTRIAL APPLICABILITY

The battery separator of the present invention has a substantially unilayered structure, and thus can uniformly hold the electrolyte. Therefore, a battery having a low inner pressure and a high capacity can be assembled therefrom. Further, the battery separator of the present invention has an apparent

The invention claimed is:

1. A battery separator consisting essentially of a nonwoven fabric having a substantially unilayered structure, wherein an apparent total surface area of fibers per a surface density of said nonwoven fabric is 20 m² or more, a thickness of said nonwoven fabric is 0.1 mm or less, a uniformity index of said nonwoven fabric is 0.15 or less, said nonwoven fabric consists essentially of non-fibrillated fibers, said nonwoven fabric contains fine fibers having a fiber diameter of 4 μm or less and high-modulus fibers having a Young's modulus of 50 cN/dtex or more, the fibers forming the nonwoven fabric are fixed substantially only by fusing the fibers to each other, the high-modulus fibers are composed of ultra-high-molecular-weight polyethylene, and the fine fibers are formed from island components remaining after removing a sea component from islands-in-sea composite fibers, wherein an average fiber diameter of the high-modulus fibers is 5 times or more an average fiber diameter of the fine fibers.

2. The battery separator according to claim 1, wherein the nonwoven fabric contains fusible fibers.

3. The battery separator according to claim 1, wherein an average fiber length of the high-modulus fibers is 2.5 times or more an average fiber length of the fine fibers.

4. The battery separator according to claim 1, wherein a maximum pore size in the nonwoven fabric is 40 μm or less.

5. A battery separator consisting essentially of a nonwoven fabric having a substantially unilayered structure, wherein an apparent total surface area of fibers per a surface density of said nonwoven fabric is 20 m² or more, a thickness of said nonwoven fabric is 0.1 mm or less, a uniformity index of said nonwoven fabric is 0.15 or less, said nonwoven fabric consists essentially of non-fibrillated fibers, said nonwoven fabric contains fine fibers having a fiber diameter of 4 μm or less and high-modulus fibers having a Young's modulus of 50 cN/dtex or more and a fiber length of 0.5 to 30 mm, the fibers forming the nonwoven fabric are fixed substantially only by fusing the fibers to each other, the high-modulus fibers are composed of high-crystalline polypropylene, and the fine fibers are formed from island components remaining after removing a sea component from islands-in-sea composite fibers, wherein an average fiber diameter of the high-modulus fibers is 5 times or more an average fiber diameter of the fine fibers.

6. The battery separator according to claim 5, wherein the nonwoven fabric contains fusible fibers.

7. The battery separator according to claim 5, wherein an average fiber length of the high-modulus fibers is 2.5 times or more an average fiber length of the fine fibers.

8. The battery separator according to claim 5, wherein a maximum pore size in the nonwoven fabric is 40 μm or less.

9. A battery separator consisting essentially of a nonwoven fabric having a substantially unilayered structure, wherein an apparent total surface area of fibers per a surface density of said nonwoven fabric is 20 m² or more, a thickness of said nonwoven fabric is 0.1 mm or less, a uniformity index of said nonwoven fabric is 0.15 or less, said nonwoven fabric consists essentially of non-fibrillated fibers, said nonwoven fabric contains fine fibers having a fiber diameter of 4 μm or less and high-modulus fibers having a Young's modulus of 50 cN/dtex or more, the fibers forming the nonwoven fabric are fixed substantially only by fusing the fibers to each other, the high-modulus fibers are composite fibers composed of high-crystalline polypropylene and having a surface of a polyethylene-based resin, and the fine fibers are formed from island components remaining after removing a sea component from islands-in-sea composite fibers, wherein an average fiber diameter of the high-modulus fibers is 5 times or more an average fiber diameter of the fine fibers.

10. The battery separator according to claim 9, wherein an average fiber length of the high-modulus fibers is 2.5 times or more an average fiber length of the fine fibers.

11. The battery separator according to claim 9, wherein a maximum pore size in the nonwoven fabric is 40 μm or less.

12. A battery separator consisting essentially of a nonwoven fabric having a substantially unilayered structure, wherein an apparent total surface area of fibers per a surface density of said nonwoven fabric is 20 m² or more, a thickness of said nonwoven fabric is 0.1 mm or less, a uniformity index of said nonwoven fabric is 0.15 or less, said nonwoven fabric consists essentially of non-fibrillated fibers, said nonwoven fabric contains fine fibers having a fiber diameter of 4 μm or less and high-modulus fibers having a Young's modulus of 50 cN/dtex or more, the fibers forming the nonwoven fabric are fixed substantially only by fusing the fibers to each other, the high-modulus fibers are composed of ultra-high-molecular-weight polyethylene, and said nonwoven fabric consists essentially of polyolefin-based fibers, wherein an average fiber diameter of the high-modulus fibers is 5 times or more an average fiber diameter of the fine fibers.

13. The battery separator according to claim 12, wherein the nonwoven fabric contains fusible fibers.

14. The batter separator according to claim 12, wherein an average fiber length of the high-modulus fibers is 2.5 times or more an average fiber length of the fine fibers.

15. The battery separator according to claim 12, wherein a maximum pore size in the nonwoven fabric is 40 μm or Less.

16. A battery separator consisting essentially of a nonwoven fabric having a substantially unilayered structure, wherein an apparent total surface area of fibers per a surface density of said nonwoven fabric is 20 m² or more, a thickness of said nonwoven fabric is 0.1 mm or less, a uniformity index of said nonwoven fabric is 0.15 or less, said nonwoven fabric consists essentially of non-fibrillated fibers, said nonwoven fabric contains fine fibers having a fiber diameter of 4 μm or less and high-modulus fibers having a Young's modulus of 50 cN/dtex or more and a fiber length of 0.5 to 30 mm, the fibers forming the nonwoven fabric are fixed substantially only by fusing the fibers to each other, the high-modulus fibers are composed of high-crystalline polypropylene, and said nonwoven fabric consists essentially of polyolefin-based fibers, wherein an average fiber diameter of the high-modulus fibers is 5 times or more an average fiber diameter of the fine fibers.

17. The battery separator according to claim 16, wherein the nonwoven fabric contains fusible fibers.

18. The batter separator according to claim 16, wherein an average fiber length of the high-modulus fibers is 2.5 times or more an average fiber length of the fine fibers.

19. The battery separator according to claim 16, wherein a maximum pore size in the nonwoven fabric is 40 μm or less.

20. A battery separator consisting essentially of a nonwoven fabric having a substantially unilayered structure, wherein an apparent total surface area of fibers per a surface density of said nonwoven fabric is 20 m² or more, a thickness of said nonwoven fabric is 0.1 mm or less, a uniformity index of said nonwoven fabric is 0.15 or less, said nonwoven fabric consists essentially of non-fibrillated fibers, said nonwoven fabric contains fine fibers having a fiber diameter of 4 μm or less and high-modulus fibers having a Young's modulus of 50 cN/dtex or more, the fibers forming the nonwoven fabric are fixed substantially only by fusing the fibers to each other, the high-modulus fibers are composite fibers composed of high-crystalline polypropylene and having a surface of a polyethylene-based resin, and said nonwoven fabric consists essentially of polyolefin-based fibers, wherein an average fiber diameter of the high-modulus fibers is 5 times or more an average fiber diameter of the fine fibers.

21. The batter separator according to claim 20, wherein an average fiber length of the high-modulus fibers is 2.5 times or more an average fiber length of the fine fibers.

22. The battery separator according to claim 20, wherein a maximum pore size in the nonwoven fabric is 40 μm or less.

* * * * *